US011194959B1

(12) United States Patent
Hitzler et al.

(10) Patent No.: US 11,194,959 B1
(45) Date of Patent: Dec. 7, 2021

(54) SMART ASSISTANCE IN UNUSED SPACE IN TABLES

(71) Applicant: SAP SE, Walldorf (DE)

(72) Inventors: Sabina Hitzler, Heidelberg (DE); Georg Christoph, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/236,551

(22) Filed: Apr. 21, 2021

(51) Int. Cl.
*G06F 40/177* (2020.01)
*G06F 9/451* (2018.01)
*G06F 3/0482* (2013.01)
*G06F 40/106* (2020.01)

(52) U.S. Cl.
CPC .......... *G06F 40/177* (2020.01); *G06F 3/0482* (2013.01); *G06F 9/453* (2018.02); *G06F 40/106* (2020.01)

(58) Field of Classification Search
CPC ............................... G06F 40/177; G06F 40/18
See application file for complete search history.

(56) References Cited

U.S. PATENT DOCUMENTS

| | | | | |
|---|---|---|---|---|
| 5,471,575 A * | 11/1995 | Giansante | ............. | G06F 40/177 715/202 |
| 9,524,287 B2 * | 12/2016 | Davis | .................... | G06F 40/103 |
| 9,558,171 B2 * | 1/2017 | Christoph | ............. | G06F 40/103 |
| 2015/0135052 A1 * | 5/2015 | Thompson | ............ | G06F 40/177 715/227 |
| 2016/0209987 A1 * | 7/2016 | Kaufthal | ............... | G06F 3/0485 |
| 2016/0209994 A1 * | 7/2016 | Kaufthal | ................... | G06F 8/38 |
| 2019/0065442 A1 | 2/2019 | Rommel et al. | | |
| 2021/0133283 A1 * | 5/2021 | Tyagi | .................... | G06F 40/103 |

OTHER PUBLICATIONS

U.S. Appl. No. 16/665,922, filed Oct. 28, 2019, Hitzler et al.
U.S. Appl. No. 16/853,989, filed Apr. 21, 2020, Hitzler.

* cited by examiner

*Primary Examiner* — Asher D Kells
(74) *Attorney, Agent, or Firm* — Fish & Richardson P.C.

(57) ABSTRACT

An example method and system for providing smart assistance in unused table space. A smart table assistance framework identifies table information of a table being presented on a table area of a display device. The table information comprises a set of table functions offered by the table and a table size, where the table size includes a table width of the presented table and a total columns' width of columns presented in the table. The framework determines a size of free space available inside the table based on the table width and the total columns' width. The smart table assistance framework determines whether smart guidance preconditions have been met based on the set of table functions and the free space size. In response to determining that the preconditions have been met, a smart guidance of a set of smart guidances is added to the free space available inside the table.

20 Claims, 10 Drawing Sheets

| Meal Management | | |
|---|---|---|
| Responsive Table 202 | | Toggle button 210 |
| Table Header 204 | | |
| Meals (13) | | |
| Name | Price | |
| Gnaochi with vegetables | 7.99 EUR | |
| Cheese spatzle with onions | 6.49 EUR | |
| Fillet of cod with lemon pepper and lentils | 9.49 EUR | |
| Hamburger with beef patty, tomato salsa, onions and french fries | 4.49 EUR | |
| Chili sin carne with long grain rice | 5.99 EUR | |
| Pasta tricolone with gorgonzola, leek, pear and broccoli | 5.99 EUR | |
| Indian-style vegetable konma with wholegrain rice | 7.99 EUR | |
| Salad with pumpkin, grapes, goat cheese and a balsamic dressing | 7.99 EUR | |
| Liver dumplings with onion gravy, sauerkraut and house-made mashed potato | 8.99 EUR | |
| Coq au vin with saute potatoes | 5.99 EUR | |
| Cream of pumpkin soup with ginger | 2.99 EUR | |
| Spice rice dish with chicken, vegetables and mushrooms | 8.99 EUR | |
| Pea soup | 3.49 EUR | |

Free Space 408

Smart Guidance 340
- Illustration 341
- Title 342
- Paging Button 345-1
- Paging Button 345-2
- Description 343 "Looks like there's free space. You can add more columns in the table settings."
- Paging Indicator 346
- Icon button 344

Smart Guidance Height 419
Free Space Height 417
Smart Guidance Width 418
Free Space Width 416
Table Width 212
Table Height 213
Column 206-1
Column 206-2
Column Width 414-1
Column Width 414-2
Columns Width 415

SMART ASSISTANCE IN UNUSED SPACE IN TABLES

BACKGROUND

Tables can be presented for users in a table area of a user interface on a display device. The table may contain a set of line items and may include rows and columns, with each row showing one line item, and the columns showing additional details about that line item. The set of line items may contain data of any kind. The table being presented on the table area of the display device may have a low number of columns presented in the table. For example, the number of columns presented in the table may be less than five columns. In some instances, the user may have hidden some columns from the complete set of columns originally presented in the table, as those now-hidden columns may not be currently required or needed by the user. In other instances, the user may resize the columns presented in the table to a smaller size. In some implementations, the width of the display device may also determine the size of the table area available for the table to be presented. For example, a mobile phone may have a narrow display device, a laptop computer may have a wider display device than the mobile phone, and a laptop computer, a desktop computer, or a server system may be coupled to a wide or very wide display device.

SUMMARY

The present disclosure describes smart assistance in unused space in tables.

In one implementation, a computer-implemented method is used for providing smart assistance in unused table space. A smart table assistance framework identifies first table information of a table being presented on a table area of a display device. The first table information comprises a set of table functions offered by the table and a table size, where the table size includes a table width of the presented table and a first total columns' width of first presented columns presented in the table. The first total columns' width represents the sum of the width of all of the first presented columns presented in the table. The framework determines a first size of a first free space available inside the table based on the table width of the presented table and the first total columns' width of the first presented columns. The smart table assistance framework determines whether smart guidance preconditions have been met based on the set of table functions and the first size. In response to determining that the preconditions have been met, a first smart guidance from a set of smart guidances is added to a first position within the first free space available inside the table.

In some instances, the smart table assistance framework detects a first interaction with the table that causes the first total columns' width to change to a second total columns' width. The framework determines a second size of a second free space available inside the table based on the table width of the presented table and the second column's width, where the second total columns' width is different than the first total columns' width. The smart table assistance framework determines whether the smart guidance preconditions have been met based on the set of table functions and the second size. In response to determining that the preconditions have been met, a second smart guidance is added to a second position within the second free space available inside the table.

In some instances, the determination that the smart guidance preconditions have been met includes a determination, by the framework, that the first size is greater than or equal to a minimum smart guidance space threshold, and that the set of table functions includes at least one of adding a column, removing a column, sorting columns, filtering columns, grouping content of columns, resizing columns, or to personalize a column otherwise. For example, a column can be personalized to add aggregations such as column totals.

In some instances, the first position of the first smart guidance within the first free space available inside the table and a size of the first smart guidance is based on the first free space size.

In some instances, a smart guidance includes at least one or more of an illustration, a title, a description, an icon button corresponding to an action, a text button corresponding to an action, a combination of an icon and text on a button corresponding to an action, a carousel having paging buttons, a paging indicator, or an animation.

In some instances, prior to adding the first smart guidance to the first position within the first free space available inside the table, the smart table assistance framework selects the first smart guidance from the set of smart guidances, where each smart guidance of the set of smart guidances corresponds to a respective table function of the set of table functions offered by the table. The framework selects the first smart guidance based on either a user selection or an automatic selection of one of the set of table functions offered by the table, where the set of table functions offered is based on the type of the table.

In some instances, a type of the presented table includes a responsive table, an analytical table, a tree table, a grid table, any type of table with responsive behavior, or other table type.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, instead of not utilizing unused space (also referred herein as free space) in a table and leaving this free space empty, context specific assistance (also referred herein as smart guidance) may be provided to a user on table features offered by the table. Second, the smart guidance may enable the user to utilize the table features and the user interface (UI) more efficiently and be faster in the user's work. Third, when a new table feature is added to the table features, the smart guidance can help to convey that this table feature is new, where to find the new table feature, and how to use the new table feature. Fourth, the context specific assistance may provide a user with a reminder of a certain function after a period of time. For example, if a certain function needs to be performed monthly, quarterly, yearly, or at another periodic time, it can be useful to highlight this feature at a certain point in time. Fifth, smart guidance may be automatically provided on a possible next step or follow-up action.

The details of one or more implementations of the subject matter of this specification are set forth in the Detailed Description, the Claims, and the accompanying drawings.

Other features, aspects, and advantages of the subject matter will become apparent to those of ordinary skill in the art from the Detailed Description, the Claims, and the accompanying drawings.

DESCRIPTION OF DRAWINGS

FIG. 4 is another screenshot of an example populated user interface for end user interactions with a responsive table illustrating smart table assistance in unused free space in the table after columns are resized, according to an implementation of the present disclosure.

Like reference numbers and designations in the various drawings indicate like elements.

DETAILED DESCRIPTION

Figure 1:
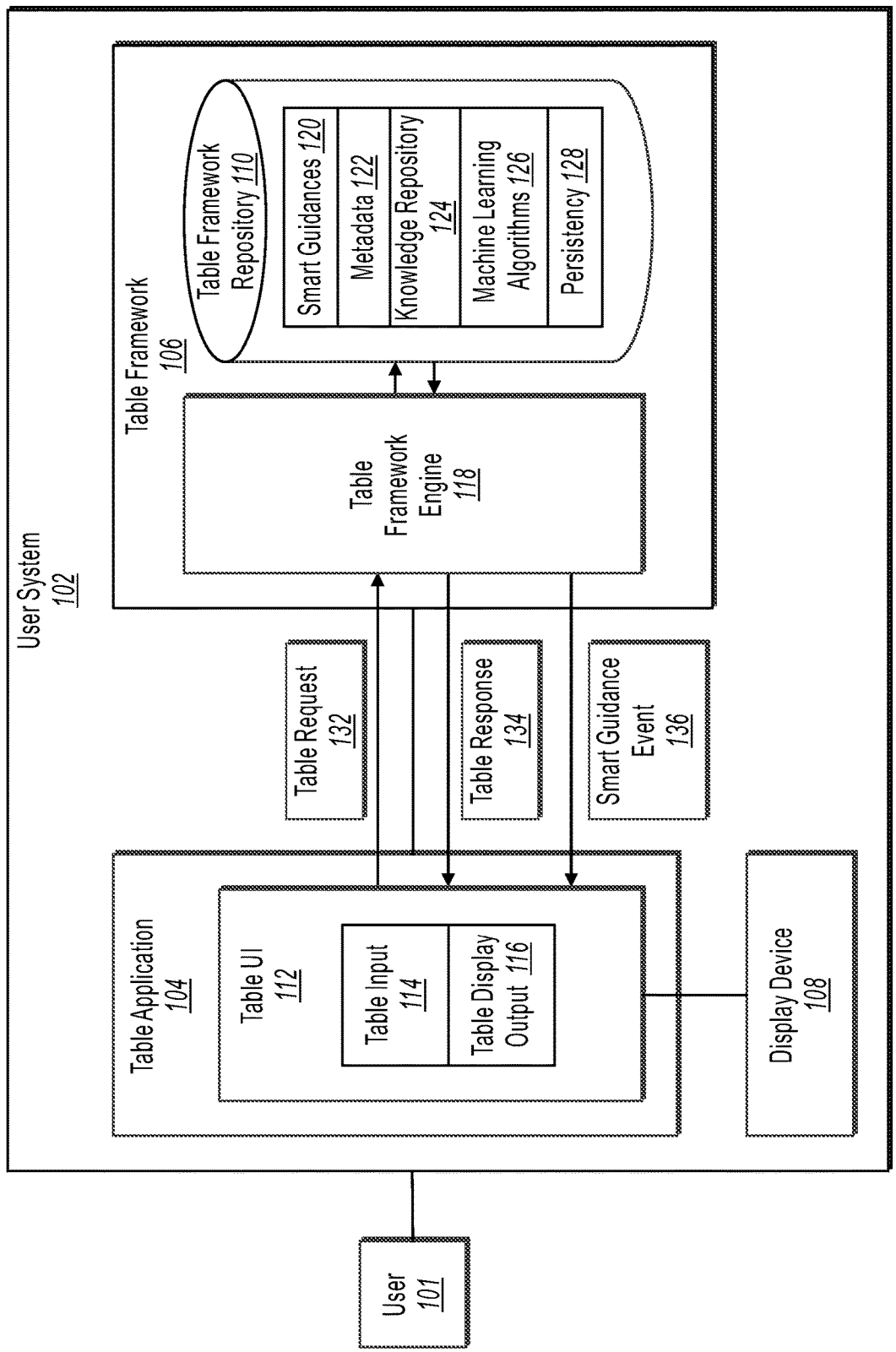
FIG. 1 is a block diagram illustrating an example system for providing smart table assistance in unused space in tables, according to an implementation of the present disclosure.

The following detailed description describes smart assistance in unused space in tables, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Tables can be presented for users in a table area of a user interface on a display device. The table may contain a set of line items and may include rows and columns, with each row showing one line item, and the columns showing additional details about that line item. The set of line items may contain data of any kind. The table being presented on the table area of the display device may have a low number of columns presented in the table. For example, the number of columns presented in the table may be less than five columns. In some instances, the user may have hidden some columns from the complete set of columns originally presented in the table, as those now-hidden columns may not be currently required or needed by the user. In other instances, the user may resize the columns presented in the table to a smaller size. In some implementations, the width of the display device may also determine the size of the table area available for the table to be presented. For example, a mobile phone may have a narrow display device, a laptop computer may have a wider display device than the mobile phone, and a laptop computer, a desktop computer, or a server system may be coupled to a wide or very wide display device.

When the table is presented in the table area on the display device, the presented table may contain unused free space inside the table in addition to the columns presented in the table. The width of the unused free space inside the table may be based on the width of the display device, the width of the table area, and/or the width of each of the columns presented in the table. For example, a table with very few columns being presented on a display device with a very wide screen may result in the table containing a wider unused free space inside the table being presented. However, this unused free space inside the table is not utilized. In another example, the width of one or more columns presented in the table on a very wide display device may get very wide resulting in the unused free space inside the table to be very narrow or non-existent, which may also result in a reduction of readability of the data in the table and/or a decrease in the efficiency of use of the table.

In contrast to typical table presentations, smart assistance in unused table space is disclosed herein. Unused space in a table may be utilized to provide context-specific assistance to a user on or related to table features offered by the table and/or the software in which the table is being generated and presented. Providing the smart guidance in the free space in the table may enable the user to utilize the table features and the user interface (UI) more efficiently and faster in the user's work, while automatically identifying and suggesting additional available features related to the current presentation. When a new table feature is added to the table features, the smart guidance can help to convey that this table feature is new, where to find the new table feature, and how to use the new table feature. The smart guidance may further provide a user with a reminder of a certain function after a period of time. For example, if a certain function needs to be performed monthly, quarterly, yearly, or at another periodic time, it can be useful to highlight this feature at a certain point in time. The smart guidance may also be automatically provided on a possible next step or follow-up action.

FIG. 1 is a block diagram illustrating an example user system 102 for providing smart table assistance in unused space in tables, according to an implementation of the present disclosure. At a high level, the illustrated user system 102 includes or is made up of one or more communicably coupled computers or other components (see FIG. 8). The user system 102 includes a table application 104 deployed on user system 102, a table framework 106 (also referred herein as a smart table assistance framework), and a display device 108. The table application 104 may include a table user interface (UI) 112 having a table input 114 and a table display output 116. As illustrated, the table framework 106 includes a table framework repository 110 and a table framework engine 118. The table framework repository 110 includes smart guidance(s) 120, metadata 122, a knowledge repository 124, machine learning algorithms 126, and persistency 128. The table framework engine 118 may include table framework-side UI functionality. The table UI 112 is a user-side UI that may be installed on user system 102 as part of the table application 104. Although the detailed description is focused on smart table assistance in unused space in table functionality, other functionality is envisioned to be covered by the described subject matter.

The table UI 112 of user system 102 allows an end user 101 to provide table input 114 as a table request 132 to the table framework engine 118 to interact with a table being presented on a table area of the display device 108. The table framework engine 118 may subsequently provide a table response 134 to table display output 116 of table UI 112 in response to the table request 132. Table UI 112 may provide table display output 116 to be presented in the table being presented on the table area of display device 108. The table input 114 provided as the table request 132 may include a request to add new columns to a presented table, a request to remove columns from a presented table, a request to sort columns in a presented table, a request to filter columns in a presented table, a request to group columns and/or their content in a presented table, a request to resize columns in a presented table, or a request to perform a new function of a set of table functions offered by the table and the table application 104.

The table display output 116 of table UI 112, provided as table response 134 by table framework engine 118, may be a smart guidance of a set of smart guidances 120 associated with a specific table function of a set of table functions offered by the table. The smart guidance provides context-specific assistance for a user that supports the user in learning how to utilize a function provided by a table, how to use a new function or feature added to the table, and/or how to support the user in finding a particular function and using the particular function in the future, among others. The smart guidance may include guidance on which table features and/or table functions a table provides, for how to add new columns to a table, for how to remove existing columns from a table, for how to sort columns in a table, for how to filter columns in a table, for how to group columns' content in a table, for how to resize columns in a responsive table, a smart guidance on how to use a new function or feature added to the table, or on how to find a particular function and using the particular function in the future. Additional smart guidances may be available in different implementations.

In some instances, a smart guidance is a recommended combination of a solution-oriented message, an engaging illustration, and a conversational tone to better communicate an empty state, a success state, an error state, a warning state, an information state, or other type of state than just a message alone. Empty states are moments in the user experience where there is nothing to display. Success states are occasions to celebrate and reward a user's special accomplishment or the completion of an important task. Through appealing illustrations and solution-oriented messaging, smart guidances may make the user experience more enjoyable and meaningful, while ensuring consistency. Through their human-centered approach, smart guidances may help to create a deeper connection with users because users feel understood and valued. Smart guidances are described later in more detail with reference to FIGS. 3 and 7.

The knowledge repository 124 may include analyzed smart guidances 120 and knowledge of smart guidances utilized by one or more users of a plurality of users associated with user system 102. The machine learning algorithms 126 may including one or more machine learning algorithms, where each machine learning algorithm 126 may be associated with a particular analysis performed by the user system 102. The table framework engine 118 may save the state of the table application 104 and the table framework 106 in persistency 128, when the user 101 ends the table application 104. The table framework engine 118 may restore the state of the table application 104 and the table framework 106 from persistency 128, such as when the user 101 restarts the table application 104, or when the user returns to a particular table. The table framework repository 110 may further comprise a database and a set of database access functions. The table framework repository 110 may comprise a relational database, for example, a SAP HANA in-memory, column-oriented, relational database management system, a Microsoft SQL server relational database management system, an open data protocol (OData) based database, a representational state transfer (REST) based database, or any other suitable type of database system.

During operation, the table framework engine 118 of the table framework 106 may identify first table information of a table being presented on a table area of the display device 108. The first table information may comprise a set of table functions offered by the table and a table size, where the table size may include a table width of the presented table and a first total columns' width of first presented columns presented in the table. The first total columns' width represents the sum of the width of all of the first presented columns presented in the table.

The table framework engine 118 can determine a first size of a first free space available inside the table based on the table width of the presented table and the first total columns' width of the first presented columns.

The table framework engine 118 can make a determination as to whether smart guidance preconditions have been met based on the set of table functions and the first size. In response to determining that the preconditions have been met, a first smart guidance of a set of smart guidances 120 may be added to a first position within the first free space available inside the table.

In some instances, prior to adding the first smart guidance to the first position within the first free space available inside the table, the table framework engine 118 may select the first smart guidance from the set of smart guidances 120, where each smart guidance corresponds to a respective table function of the set of table functions offered by the table.

The table framework engine's 118 selection of the first smart guidance can be based on at least one of a user selection of one of the set of table functions offered by the table, or, alternatively, on an automatic selection of one of the set of table functions offered by the table. The set of table functions offered can be based on the type of the table, where the table type may include a responsive table, an analytical table, a tree table, a grid table, any type of table with responsive behavior, or other table type, among others.

In some instances, the determination that the smart guidance preconditions have been met can include a determination, by table framework engine 118, that the first size is greater than or equal to a minimum smart guidance space threshold, and that the set of table functions includes at least one of adding a column, removing a column, sorting columns, filtering columns, grouping content of columns, resizing columns, or to personalize a column otherwise. For example, a column can be personalized to add aggregations such as column totals.

In some instances, the first position of the first smart guidance within the first free space available inside the table and a size of the first smart guidance is based on the first free space size.

The table framework engine 118 may detect a first interaction with the table that causes the first total columns' width to change to a second total columns' width. The table framework engine 118 can determine a second size of a second free space available inside the table based on the table width of the presented table and the second total columns' width, where the second total columns' width is different than the first total columns' width. The table framework engine 118 can determine whether the smart guidance preconditions have been met based on the set of table functions and the second size. In response to determining that the preconditions have been met, a second smart guidance is added to a second position within the second free space available inside the table.

Figure 2:
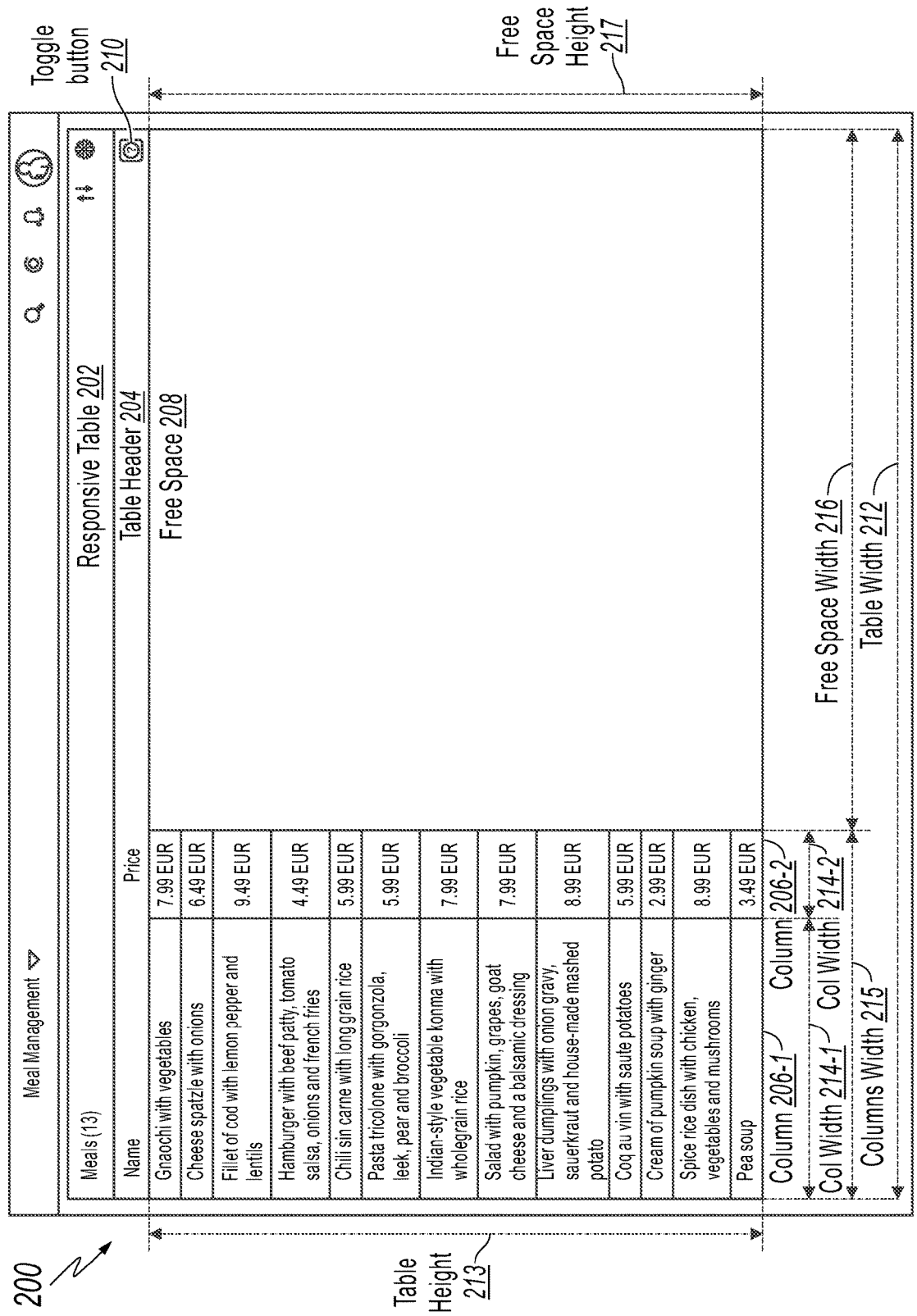
FIG. 2 is a screenshot of an example populated user interface for end user interactions with a responsive table illustrating unused free space in the table, according to an implementation of the present disclosure.

FIG. 2 is a screenshot of an example populated UI 200 for end user interactions with a responsive table illustrating unused free space in the table, according to an implementation of the present disclosure. As shown, UI 200 is populated with a responsive table 202, which is presented on a table area of a display device 108 of user system 102 (see FIG. 1). Responsive table 202 includes a table header 204, columns 206 including columns 206-1 and 206-2, and free space 208. Table header 204 also includes a toggle button 210. Responsive table 202 has an associated table size, which includes a table width 212 and a table height 213 of the responsive table 202. Columns 206-1 and 206-2 each have respective column sizes including column widths 214-1 and 214-2, respectively. Columns width 215 represents the sum of the width of all of the presented columns 206 presented in responsive table 202, where columns width 215 is the sum of column widths 214-1 and 214-2. In an example implementation, display device 108 may be a wide screen display. The column widths 214-1 and 214-2 may be appropriately sized for legibility reasons so that the presented columns 206 do not take up the entire table width 212 available for the presented responsive table 202. In some instances, that columns width 215 may be a predetermined or predefined percentage of the available table width 212. Different size displays may be associated with different percentages, in some instances. As another example, a user may have hidden one or more other columns from view, which may have caused the columns actually presented not to utilize the entire table width 212 of responsive table 202.

As presented in UI 200, unused free space 208 inside responsive table 202 is also shown. The free space 208 has an associated free space size including a free space width 216 and a free space height 217 inside responsive table 202. Table framework engine 118 (as described in FIG. 1) may determine the size of the free space 208 available inside the responsive table 202 based on the table width 212 and the table height 213 of table 202, and on the columns width 215 of the presented columns 206. For example, table framework engine 118 may determine the free space width 216 by subtracting the columns width 215 from the table width 212 to obtain the free space width 216 as the difference. Table framework engine 118 may determine the free space height 217 as being the same as the table height 213. In another example, table framework engine 118 may determine the free space height 217 as the sum of the height of all of the presented rows presented in responsive table 202.

Figure 3:
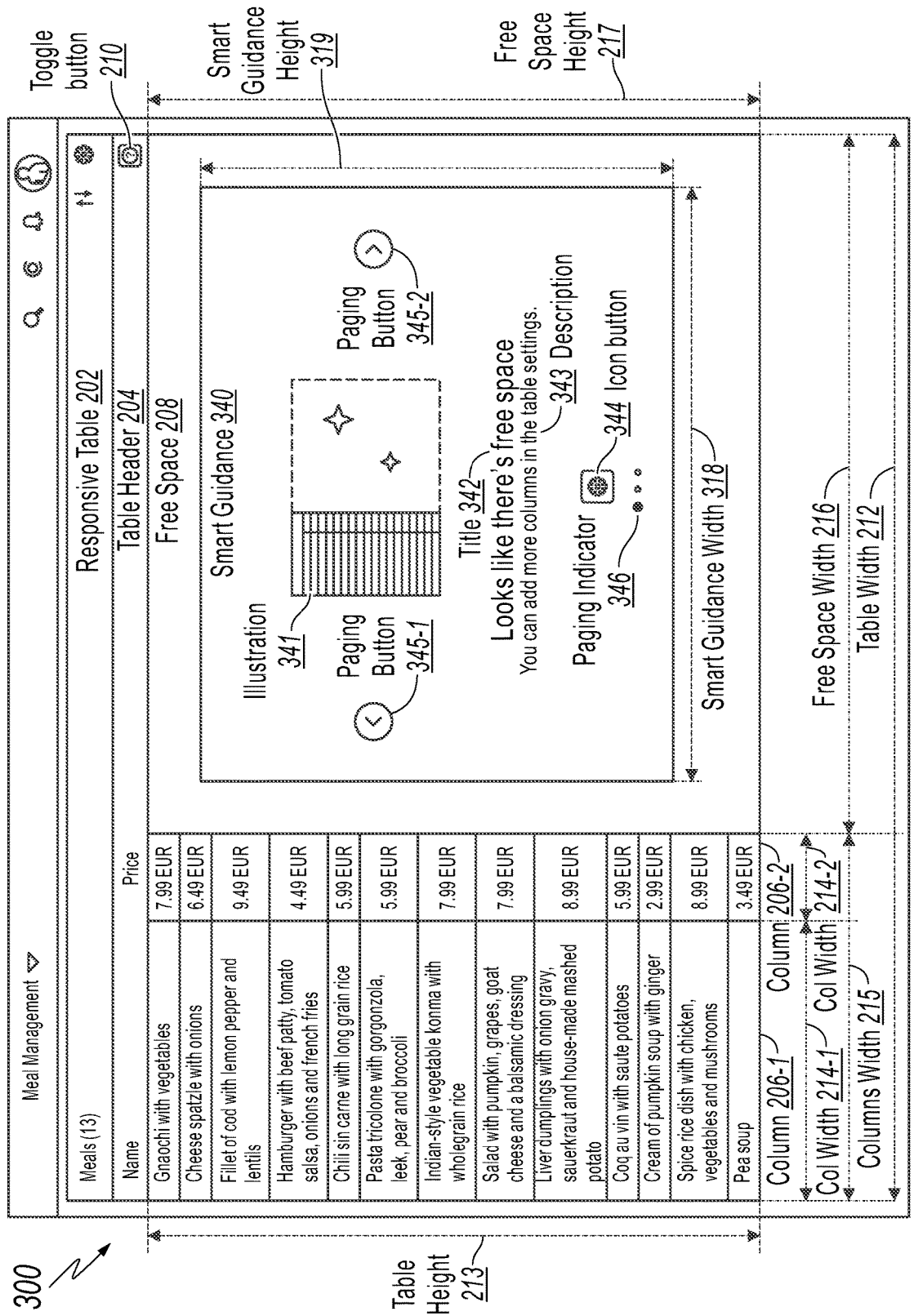
FIG. 3 is another screenshot of an example populated user interface for end user interactions with a responsive table illustrating smart table assistance in unused free space in the table, according to an implementation of the present disclosure.

FIG. 3 is another screenshot of an example populated UI 300 for end user interactions with a responsive table illustrating smart table assistance in unused free space in the table, according to an implementation of the present disclosure. As shown, UI 300 is populated with the responsive table 202 as previously described in FIG. 2. Toggle button 210 allows a user to enable or disable smart table assistance functionality. In this example, smart table assistance functionality has been enabled, which allows smart table assistance to be provided in the free space 208, the unused space in responsive table 202. As previously described with reference to FIG. 2, table framework engine 118 may determine the size of free space 208 including the free space width 216 and the free space height 217 available inside the responsive table 202 based on the table width 212, the table height 213, and the columns width 215. Table framework engine 118 may then determine whether smart guidance preconditions have been met based on the set of table functions provided by responsive table 202 and the free space size of free space 208.

A minimum set of table functions that may be offered by any table includes at least an adding columns function, a removing columns function, a sorting columns function, a filtering columns function, a grouping content of columns function, and a resizing columns function. A particular table may offer at least this minimum set of table functions or only a subset of this minimum set of table functions. Smart guidances 120 in table framework 106 includes at least one smart guidance that corresponds to a respective table function of at least this minimum set of table functions that may be offered by any table.

As one precondition for providing smart guidance, it may be required that a set of table functions offered by a particular table includes at least one table function of the minimum set of table functions that may be offered by any table so that at least one corresponding smart guidance may be provided. As another precondition, a requirement may be that enough available free space exists so that at least a minimally sized smart guidance can be presented.

The smart guidance precondition may be determined to be met when the set of table functions offered by the table includes at least one table function of the minimum set of table functions that may be offered by any table.

The table framework engine 118 may determine that the free space size precondition has been met when the size of the free space 208 is greater than or equal to a minimum smart guidance threshold. The minimum smart guidance threshold may be set to a minimum smart guidance width and/or a minimum smart guidance height so that a smart guidance is displayed properly, and is appropriately sized for legibility reasons. The smallest allowed smart guidance can be set so that the visualization is large enough to be viewed and understood by a user. For example, the minimum smart guidance threshold can be used to ensure that the free space width 216 is greater than or equal to a width of the smart guidance, and the free space height 217 is greater than or equal to a height of the smart guidance.

In response to determining that the smart guidance preconditions have been met, the table framework engine 118 may add a smart guidance to a position within the free space 208 available inside the responsive table 202. A smart guidance width 318 and a smart guidance height 319 may be appropriately sized for legibility reasons so that a smart guidance 340 may not take up the entire free space width 216, or may not take up the entire free space height 217. The position of the smart guidance 340 within the free space 208 may also be appropriately positioned for legibility reasons of both the presented smart guidance 340 and the presented columns 206. In an example implementation, smart guidance 340 may be vertically and/or horizontally centered within free space 208. Elements within smart guidance 340 may also be horizontally and vertically centered. Smart guidance 340 provides context-specific assistance for a user that supports the user in learning how to utilize a function provided by a table, such as, how to add new columns to a table, remove existing columns from a table, sort columns in a table, filter columns in a table, group columns' content in a table, resize columns in a responsive table, or use a new function or feature added to the table, among others. The context-specific assistance may also support the user in finding a particular function and using the function in the future.

UI 300 is illustrated as being populated with smart guidance 340 presented in free space 208. Smart guidance 340 has an associated smart guidance size, including smart guidance width 318 and smart guidance height 319. As shown, smart guidance 340 includes an illustration 341, a title 342, a description 343, an icon button 344, a left paging button 345-1, a right paging button 345-2, and a paging indicator 346. The icon button 344 may also be a text button, or a combination of an icon and text on a button.

The illustration 341 may be an engaging illustration that is specific to a table function provided by the table and associated with the smart guidance 340 being presented. The title 342 may be presented as a line of text in the title presentation area and may be a wrapping title. Presentation of the title in the presentation area may include line breaking, also known as word wrapping, in breaking a section of the text into lines so that it will fit into the available width of the presentation area. The description 343 may be a wrapping description and may describe how to use a table function provided by responsive table 202 and associated with the smart guidance 340 being presented.

The icon button 344 in smart guidance 340 may lead to the same destination as the same icon button in the table tool bar of responsive table 202. For example, the same destination may be a table personalization dialog where the user can add, filter, group, sort, or remove columns from the table. The table personalization dialog can be a Hypertext Transfer Protocol (HTTP) or a Hypertext Transfer Protocol Secure (HTTPS) that may be use for communication or secure communication over a computer network such as the Internet. The icon button 344, as depicted in FIG. 3, opens a dialog, which provides the possibility to add or remove columns. Clicking the same icon button in the table tool bar of responsive table 202 also opens the same dialog for adding and removing columns. The same icon button in the table tool bar of responsive table 202 and the corresponding icon button 344 in smart guidance 340 both lead to the same dialog. The user may trigger the icon button 344 using a press on touch and non-touch devices, or using an enter key or another key on a keyboard.

The paging buttons 345 may be presented when more than one smart guidance 340 in a smart guidance carousel may be appropriate for presentation in free space 208. The paging buttons 345 allow the user to navigate through the different smart guidances 340 in the smart guidance carousel. The paging indicator 346 may include dot indicators, where each dot indicator is associated with a respective smart guidance 340 in the smart guidance carousel. When there is only one smart guidance 340 for presentation in the free space 208, the paging buttons 345 and the paging indicator 346 may not be presented.

In an example implementation, when a user scrolls the responsive table, the smart guidance 340 being presented within the responsive table 202 keeps its place, and does not require a scroll area. In some implementations, if the smart guidance 340 is enabled for a table, then it is automatically displayed by default. In the table header 204, the smart guidance 340 may be disabled or turned off by pressing the toggle button 210 in the table header 204. Once the smart guidance 340 is turned off, the smart guidance 340 may be turned on again by pressing the toggle button. The turn off/on effect may have a dedicated animation.

In an example, the smart guidance 340 may behave responsively, and it may have or be associated with a minimum size. If the free space 208 falls below the minimum size, then the smart guidance 340 and the toggle button 210 may be hidden. When the user resizes the presented columns, removes or hides columns, or otherwise modifies their display, for example, resizing a browser, for instance, resulting in enough space to display the smart guidance 340, then the smart guidance 340 and the toggle button 340 may automatically appear again.

In an example, the smart guidance 340 may only be displayed when the whole rows' height is higher than the smart guidance height 319 of the smart guidance 340. Otherwise, the smart guidance 340 and the toggle button 210 may be hidden.

FIG. 4 is another screenshot of an example populated user interface for end user interactions with a responsive table 202 illustrating smart table assistance in unused free space. In this example, an illustration of the table 202 after columns are resized is presented, according to an implementation of the present disclosure. As shown, UI 400 is populated with the responsive table 202, as previously described in FIG. 3, after the column widths of presented columns 206-1 and 206-2 in presented responsive table 202 have been resized from column widths 214-1 and 214-2 in FIG. 3 to new column widths 414-1 and 414-2. As a result, the columns width of presented columns 206 has also been changed from columns width 215 (in FIG. 3) to columns width 415.

Table framework engine 118 may detect an interaction with responsive table 202 that causes the columns width 215 to change to columns width 415. For example, table framework 118 may detect the interaction to resize and increase the size of the presented columns 206-1 and 206-2 from column widths 214-1 and 214-2 to the column widths 414-1 and 414-2. Alternative interactions may include resizing the entirety of the application, moving to a new display area, changing a relative zoom percentage, or otherwise modifying the available area in which the table can be presented.

Table framework engine 118 may determine a second free space size of a second free space 408, which includes a second free space width 416 and a second free space height 417 available inside the responsive table 202 based on the table width 212 and the table height 213 of the presented responsive table 202, as well as the changed columns width 415 of the presented columns 206. Because the columns width 415 of the resized columns 206 has been increased, the second free space size of the second free space 408 has been decreased from the free space size of free space 208, and the second free space width 416 of free space 408 has been decreased from the free space width 216 of free space 208. Table framework engine 118 may then determine whether smart guidance preconditions have been met based on the set of table functions provided by responsive table 202 and the second free space size of free space 408, in a similar manner as previously described with reference to FIG. 3. In response to determining that the smart guidance preconditions have been met, the table framework engine 118 may add a smart guidance of a set of smart guidances to a second position within the free space 408 available inside the responsive table 202.

UI 400 is further populated with smart guidance 340 being presented in free space 408 within responsive table 202. Because the second free space size of the second free space 408 and the second free space width 416 of free space 408 have been decreased, a smart guidance size of the smart guidance 340 including a smart guidance width 418 and a smart guidance height 419 may need to be decreased in size so that the smart guidance 340 may be appropriately presented within the free space 408 within responsive table 202. As shown, smart guidance 340 and the elements within smart guidance 340 have been reduced in size. For example, the illustration 341, the title 342, and the description 343 in smart guidance 340 have been decreased in size and the title 342 and the description 343 have been wrapped. In another example, the illustration 341 may be replaced with a simpler version that is decreased in size based on the available space for the illustration within smart guidance 340. This simpler version of the illustration 341 may also have fewer details in the illustration. The illustration 341, the title 342, the description 343, and the icon button 344 combination is a control itself. This combination, also referred to as an illustrated message, acts adaptively. For example, the illustration may be exchanged to another illustration when a certain illustration size available threshold is reached, the text of the title 342 and the description 343 may also adapt in size when certain text size available thresholds are reached, such as, getting bigger or smaller, and the icon button 344 can adapt based on whether UI 400 is running on a touch device or not. On touch devices, the icon button 334 may get bigger to accommodate a user's bigger fingers.

Figure 5:
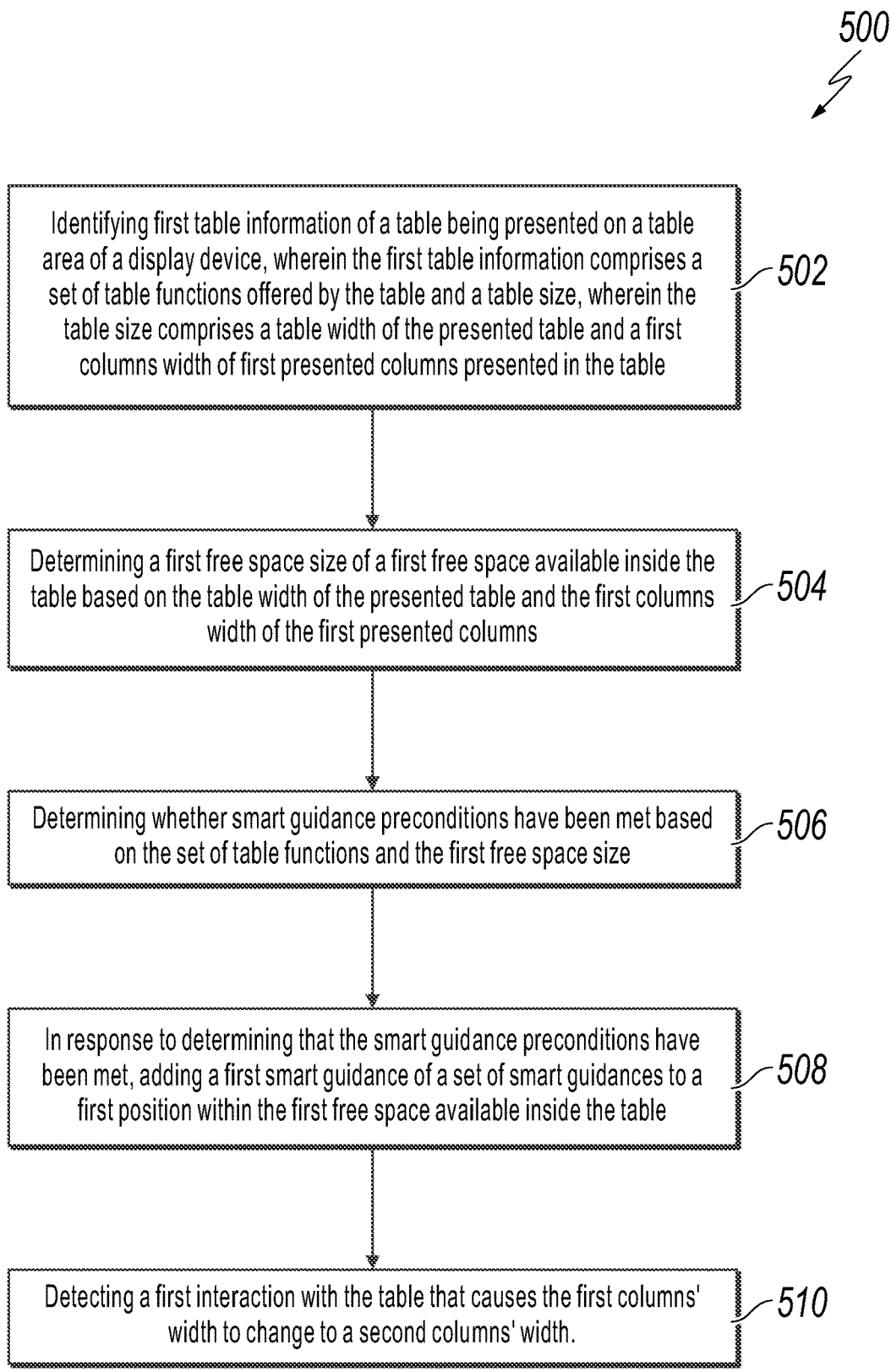
FIG. 5 is a flowchart illustrating an example of a computer-implemented method for providing smart table assistance in unused space in tables, according to an implementation of the present disclosure.

FIG. 5 is a flowchart illustrating an example of a computer-implemented method for providing smart assistance in unused table space, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order. In the current example, the operations of method 500 are performed by a smart table assistance framework, such as the framework described in prior solutions. The smart table assistance framework may be an inherent portion of an operating system, browser, or other application in some instances. The framework may also be a standalone component or application interacting with other described components.

At 502, smart table assistance framework identifies first table information of a table being presented on a table area of a display device. The first table information comprises a set of table functions offered by the table and a table size, where the table size includes a table width of the presented table and a first total columns' width of first presented columns presented in the table. In some implementations, a type of the presented table includes a responsive table, an analytical table, a tree table, or a grid table. From 502, method 500 proceeds to 504.

At 504, a first size of a first free space available inside the table is determined based on the table width of the presented table and the first total columns' width of the first presented columns. From 504, method 500 proceeds to 506.

At 506, the smart table assistance framework determines whether smart guidance preconditions have been met based on the set of table functions and the first size.

In some implementations, the determination that the smart guidance preconditions have been met includes a determination that the first size is greater than or equal to a minimum smart guidance space threshold, and that the set of table functions includes at least one of adding a column, removing a column, sorting columns, filtering columns, grouping content of columns, or resizing columns, among others. From 506, method 500 proceeds to 508.

At 508, in response to determining that the preconditions have been met, a first smart guidance of a set of smart guidances is added to a first position within the first free space available inside the table.

In some implementations, prior to adding the first smart guidance to the first position within the first free space available inside the table, the first smart guidance is selected from the set of smart guidances. Each smart guidance corresponds to a respective table function of the set of table functions offered by the table. Selecting the first smart guidance can be based on at least one of a user selection of one of the set of table functions offered by the table, or, alternatively, based on an automatic selection of one of the set of table functions offered by the table. The set of table functions offered can be based on the type of the table.

In some implementations, the first position of the first smart guidance within the first free space available inside the table and a size of the first smart guidance is based on the first free space size.

In some implementations, a smart guidance includes at least one or more of an illustration, a title, a description, an icon button corresponding to an action, a carousel having paging buttons, a paging indicator, or an animation. From 508, method 500 proceeds to 510.

At 510, the framework detects a first interaction with the table that causes the first total columns' width to change to a second total columns' width. The framework determines a second size of a second free space available inside the table based on the table width of the presented table and the second total columns' width, where the second total columns' width is different than the first total columns' width. The smart table assistance framework determines whether the smart guidance preconditions have been met based on the set of table functions and the second size. In response to determining that the preconditions have been met, a second smart guidance is added to a second position within the second free space available inside the table. After 510, method 500 stops.

Figure 6A:
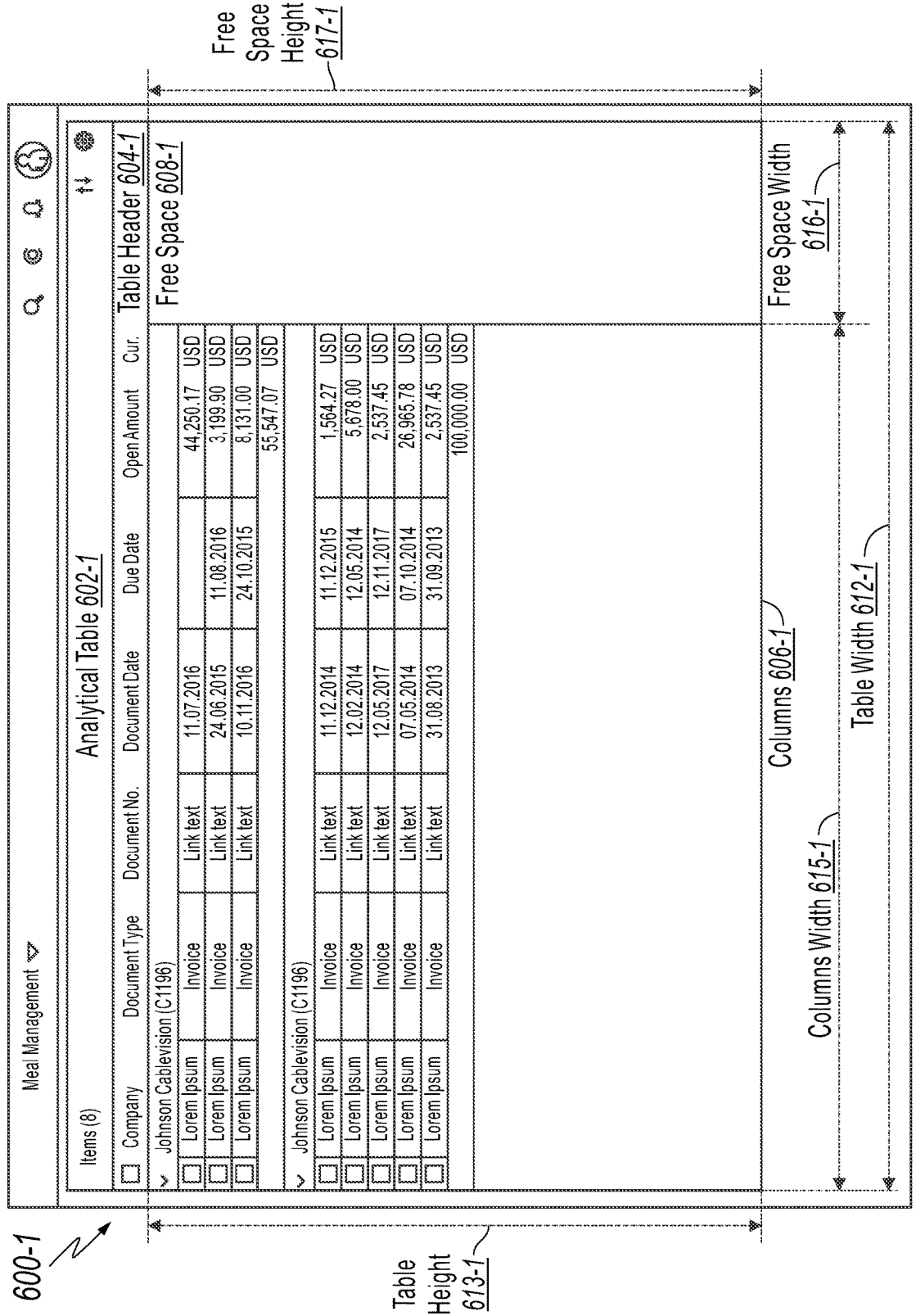
FIGS. 6A-6C are screenshots of example populated user interfaces for end user interactions with tables of different types illustrating unused free space in the tables, according to an implementation of the present disclosure.
Figure 6B:
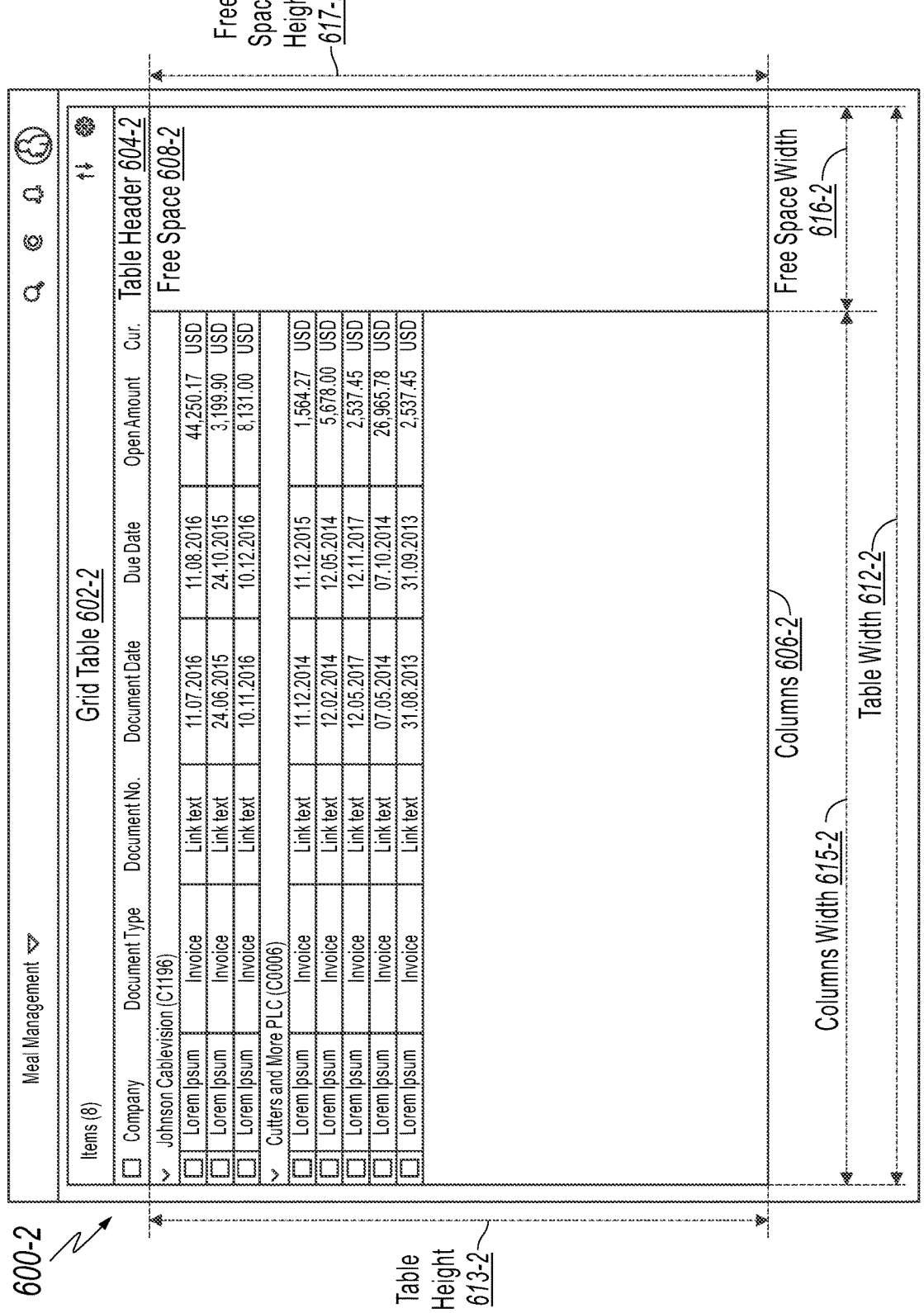
Figure 6C:
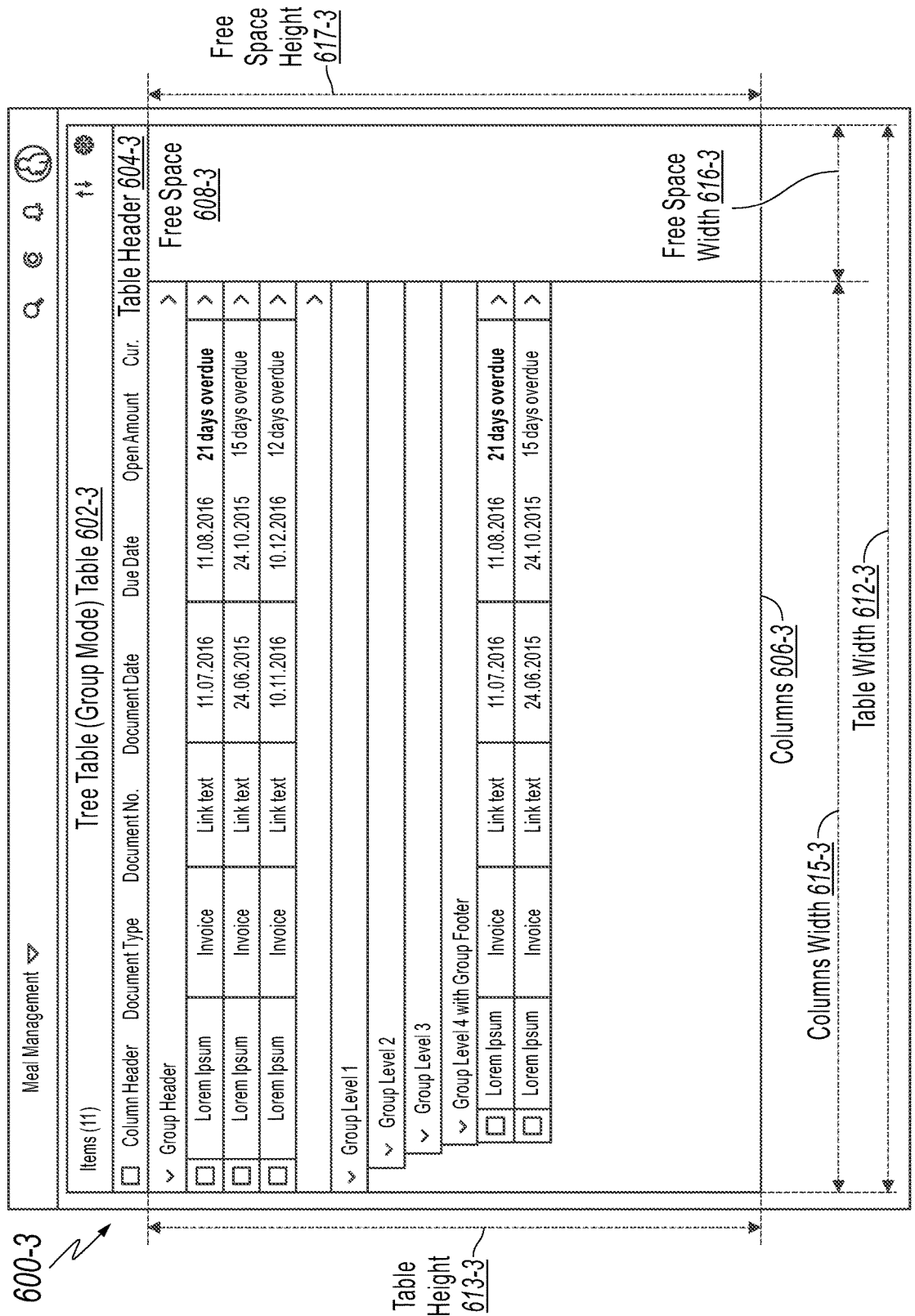

FIGS. 6A-6C are screenshots of example populated UIs 600 for end user interactions with tables of different types illustrating unused free space in the tables, according to an implementation of the present disclosure.

As shown in FIG. 6A, UI 600-1 is populated with an analytical table 602-1 being presented on a table area of display device 108 of user system 102 (see FIG. 1). UI 600-1 is similar to UIs 200, 300, and 400 of FIGS. 2, 3 and 4, respectively. Analytical table 602-1 includes a table header 604-1, columns 606-1, and free space 608-1. Analytical table 602-1 has an associated table size including a table width 612-1 and a table height 613-1 of the presented analytical table 602-1. A columns width 615-1 represents the sum of the width of all of the presented columns 606-1 presented in analytical table 602-1. As presented in UI 600-1, unused free space 608-1 inside analytical table 602-1 is also shown. The free space 608-1 has an associated free space size including a free space width 616-1 and a free space height 617-1 of the free space 608-1 available inside analytical table 602-1. Table framework engine 118 (see FIG. 1) may determine the size of the free space 608-1 available inside the analytical table 602-1 based on the table width 612-1 and the table height 613-1 of the presented analytical table 602-1, and the columns width 615-1 of the presented columns 606-1, in a similar manner as previously described with reference to FIG. 2. For example, table framework engine 118 may determine the free space width 616-1 by subtracting the columns width 615-1 from the table width 612-1 to obtain the free space width 616-1 as the difference. Table framework engine 118 may determine the free space height 617-1 as being the same as the table height 613-1. As previously described with reference to FIGS. 3 and 4, table framework engine 118 may provide smart table assistance in unused free space 608-1 in analytical table 602-1 in a similar manner as smart table assistance in unused free space 208 in responsive table 202 was provided.

As shown in FIG. 6B, UI 600-2 is populated with a grid table 602-2 being presented on a table area of display device 108 of user system 102. UI 600-2 is similar to UIs 200, 300, and 400 of FIGS. 2, 3 and 4, respectively. Grid table 602-2 includes a table header 604-2, columns 606-2, and free space 608-2. Grid table 602-2 has an associated table size including a table width 612-2 and a table height 613-2 of the presented grid table 602-2. A columns width 615-2 represents the sum of the width of all of the presented columns 606-2 presented in grid table 602-2. As presented in UI 600-2, unused free space 608-2 inside grid table 602-2 is also shown. The free space 608-2 has an associated free space size including a free space width 616-2 and a free space height 617-2 of the free space 608-2 available inside grid table 602-2. Table framework engine 118 may determine the size of the free space 608-2 available inside the grid table 602-2 based on the table width 612-2 and the table height 613-2 of the presented grid table 602-2, and the columns width 615-2 of the presented columns 606-2, in a similar manner as previously described with reference to FIG. 2. For example, table framework engine 118 may determine the free space width 616-2 by subtracting the columns width 615-2 from the table width 612-2 to obtain the free space width 616-2 as the difference. Table framework engine 118 may determine the free space height 617-2 as being the same as the table height 613-2. As previously described with reference to FIGS. 3 and 4, table framework engine 118 may provide smart table assistance in unused free space 608-2 in grid table 602-2 in a similar manner as smart table assistance in unused free space 208 in responsive table 202 was provided.

As shown in FIG. 6C, UI 600-3 is populated with a tree table 602-3 (also referred herein as a group mode table) being presented on a table area of display device 108 of user system 102. UI 600-3 is similar to UIs 200, 300, and 400 of FIGS. 2, 3 and 4, respectively. Tree table 602-3 includes a table header 604-3, columns 606-3, and free space 608-3. Tree table 602-3 has an associated table size including a table width 612-3 and a table height 613-3 of the presented tree table 602-3. A columns width 615-3 represents the sum of the width of all of the presented columns 606-3 presented in tree table 602-3. As presented in UI 600-3, unused free space 608-3 inside tree table 602-3 is also shown. The free space 608-3 has an associated free space size including a free space width 616-3 and a free space height 617-3 of the free space 608-3 available inside tree table 602-3. Table framework engine 118 may determine the size of the free space 608-3 available inside the tree table 602-3 based on the table width 612-3 and the table height 613-3 of the presented tree table 602-3, and the columns width 615-3 of the presented columns 606-3, in a similar manner as previously described with reference to FIG. 2. For example, table framework engine 118 may determine the free space width 616-3 by subtracting the columns width 615-3 from the table width 612-3 to obtain the free space width 616-3 as the difference. Table framework engine 118 may determine the free space height 617-3 as being the same as the table height 613-3. As previously described with reference to FIGS. 3 and 4, table framework engine 118 may provide smart table assistance in unused free space 608-3 in tree table 602-3 in a similar manner as smart table assistance in unused free space 208 in responsive table 202 was provided.

Figure 7:
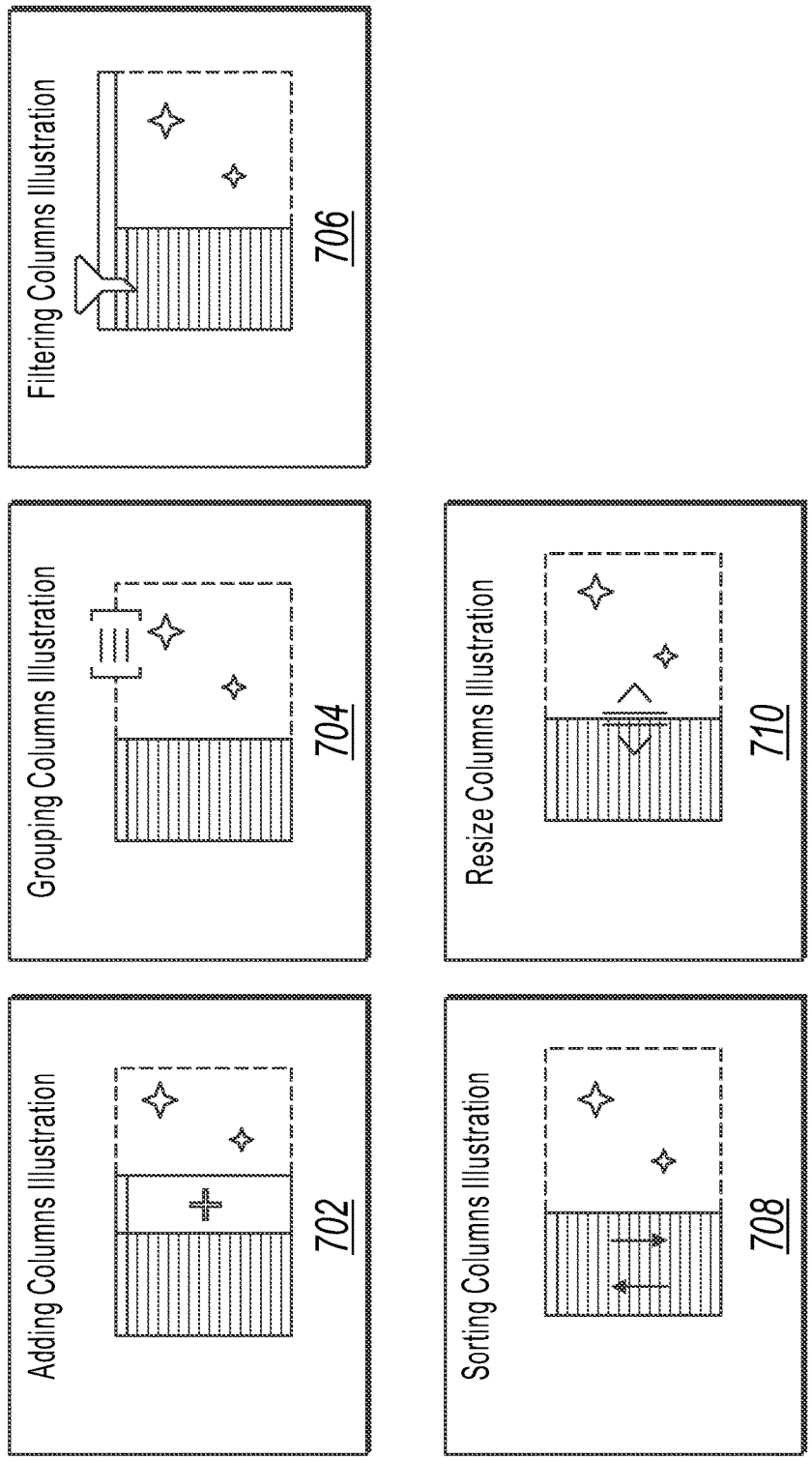
FIG. 7 are block diagrams illustrating example smart table assistance illustrations associated with respective table functions offered by a table, according to an implementation of the present disclosure.

FIG. 7 are block diagrams illustrating example smart table assistance illustrations 700 associated with respective table functions offered by a table, according to an implementation of the present disclosure. As shown, smart table assistance illustration 702 is an example illustration that may be specific to an adding columns table function offered by a table, which includes an addition symbol representing adding columns to a table and an additional column. Smart table assistance illustration 704 is an example illustration that may be specific to a grouping columns' content table function offered by a table, which includes a group symbol representing grouping column's content of a table and grouped columns' content. Smart table assistance illustration 706 is an example illustration that may be specific to a filtering columns table function offered by a table, which includes a filter symbol representing filtering columns of a table. Smart table assistance illustration 708 is an example illustration that may be specific to a sorting columns table function offered by a table, which includes up and down arrows as sorting symbols representing sorting columns of a table in an ascending or descending order. Smart table assistance illustration 710 is an example illustration that may be specific to a resizing columns table function offered by a table, which includes a less than "<", a greater than ">", and a double bar "H" symbols representing resizing columns of a table in an increasing width or decreasing width of a column of the table. Smart table assistance illustrations 702, 704, 706, 708, and 710 may be associated with one or more smart guidances of a set of smart guidances provided by a table.

Other example smart table assistance illustrations (not shown) may also be included in a set of smart guidances provided by a table or added to the set of smart guidances provided by the table when one or more new table functions are added to and provided by the table.

Figure 8:
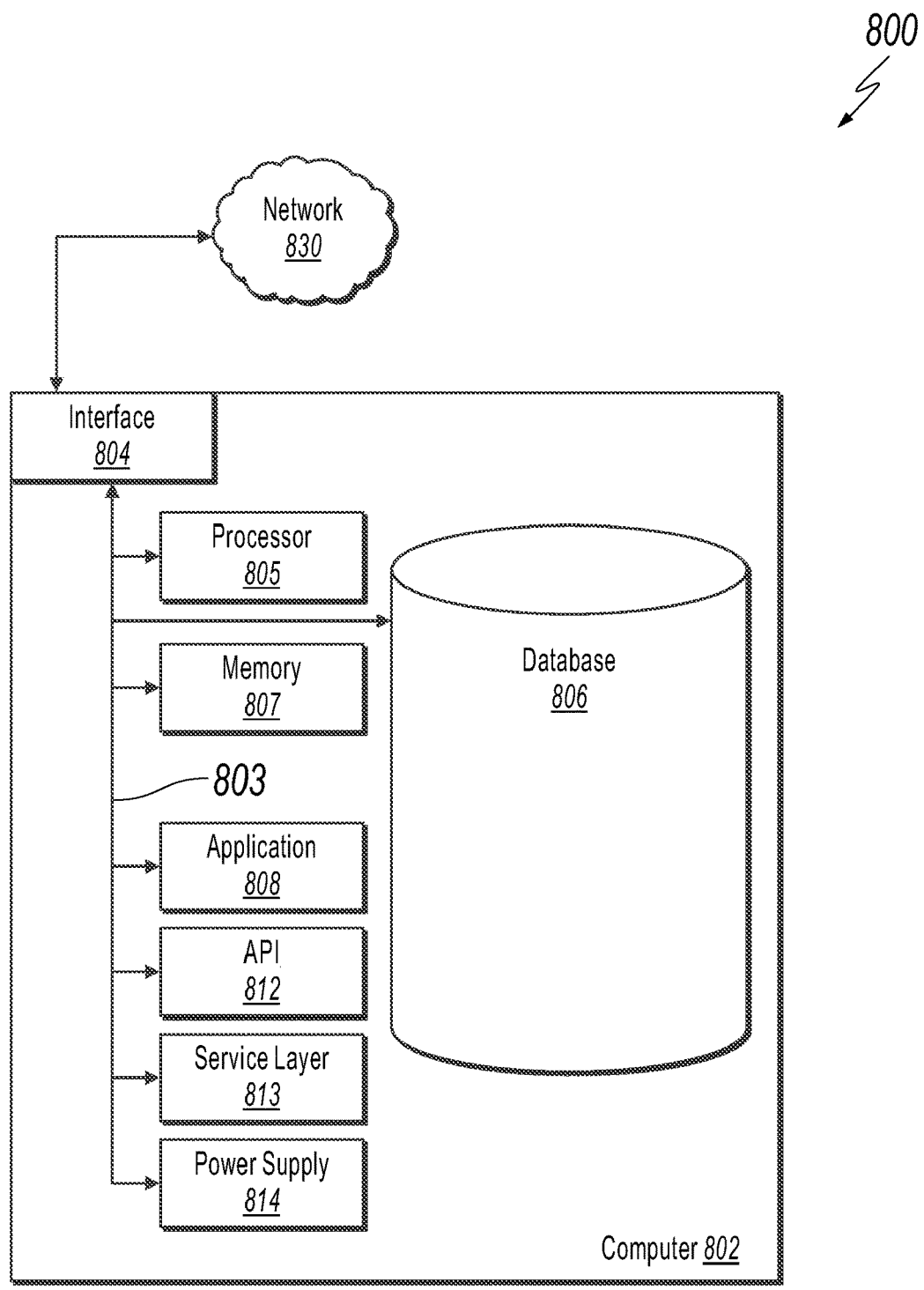
FIG. 8 is a block diagram illustrating an example of a computer-implemented system used to provide computational functionalities associated with described algorithms, methods, functions, processes, flows, and procedures, according to an implementation of the present disclosure.

FIG. 8 is a block diagram illustrating an example of a computer-implemented system 800 used to provide computational functionalities associated with described algorithms, methods, functions, processes, flows, and procedures, according to an implementation of the present disclosure. In the illustrated implementation, system 800 includes a computer 802 and a network 830.

The illustrated computer 802 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the computer 802 can include an input device, such as a keypad, keyboard, or touch screen, or a combination of input devices that can accept user information, and an output device that conveys information associated with the operation of the computer 802, including digital data, visual, audio, another type of information, or a combination of types of information, on a graphical-type user interface (UI) (or GUI) or other UI.

The computer 802 can serve in a role in a distributed computing system as, for example, a client, network component, a server, or a database or another persistency, or a combination of roles for performing the subject matter described in the present disclosure. The illustrated computer 802 is communicably coupled with a network 830. In some implementations, one or more components of the computer 802 can be configured to operate within an environment, or a combination of environments, including cloud-computing, local, or global.

At a high level, the computer 802 is an electronic computing device operable to receive, transmit, process, store, or manage data and information associated with the described subject matter. According to some implementations, the computer 802 can also include or be communicably coupled with a server, such as an application server, e-mail server, web server, caching server, or streaming data server, or a combination of servers.

The computer 802 can receive requests over network 830 (for example, from a client software application executing on another computer 802) and respond to the received requests by processing the received requests using a software application or a combination of software applications. In addition, requests can also be sent to the computer 802 from internal users (for example, from a command console or by another internal access method), external or third-parties, or other entities, individuals, systems, or computers.

Each of the components of the computer 802 can communicate using a System Bus 803. In some implementations, any or all of the components of the computer 802, including hardware, software, or a combination of hardware and software, can interface over the System Bus 803 using an application programming interface (API) 812, a service layer 813, or a combination of the API 812 and service layer 813. The API 812 can include specifications for routines, data structures, and object classes. The API 812 can be either computer-language independent or dependent and refer to a complete interface, a single function, or even a set of APIs. The service layer 813 provides software services to the computer 802 or other components (whether illustrated or not) that are communicably coupled to the computer 802. The functionality of the computer 802 can be accessible for all service consumers using the service layer 813. Software services, such as those provided by the service layer 813, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the computer 802, alternative implementations can illustrate the API 812 or the service layer 813 as stand-alone components in relation to other components of the computer 802 or other components (whether illustrated or not) that are communicably coupled to the computer 802. Moreover, any or all parts of the API 812 or the service layer 813 can be implemented as a child or a sub-module of another software module, enterprise application, or hardware module without departing from the scope of the present disclosure.

The computer 802 includes an interface 804. Although illustrated as a single interface 804, two or more interfaces 804 can be used according to particular needs, desires, or particular implementations of the computer 802. The interface 804 is used by the computer 802 for communicating with another computing system (whether illustrated or not) that is communicatively linked to the network 830 in a distributed environment. Generally, the interface 804 is operable to communicate with the network 830 and includes logic encoded in software, hardware, or a combination of software and hardware. More specifically, the interface 804 can include software supporting one or more communication protocols associated with communications such that the network 830 or hardware of interface 804 is operable to communicate physical signals within and outside of the illustrated computer 802.

The computer 802 includes a processor 805. Although illustrated as a single processor 805, two or more processors 805 can be used according to particular needs, desires, or particular implementations of the computer 802. Generally, the processor 805 executes instructions and manipulates data to perform the operations of the computer 802 and any algorithms, methods, functions, processes, flows, and procedures as described in the present disclosure.

The computer 802 also includes a database 806 that can hold data for the computer 802, another component communicatively linked to the network 830 (whether illustrated or not), or a combination of the computer 802 and another component. For example, database 806 can be an in-memory or conventional database storing data consistent with the present disclosure. In some implementations, database 806 can be a combination of two or more different database types (for example, a hybrid in-memory and conventional database) according to particular needs, desires, or particular implementations of the computer 802 and the described functionality. Although illustrated as a single database 806, two or more databases of similar or differing types can be used according to particular needs, desires, or particular implementations of the computer 802 and the described functionality. While database 806 is illustrated as an integral component of the computer 802, in alternative implementations, database 806 can be external to the computer 802.

The computer 802 also includes a memory 807 that can hold data for the computer 802, another component or components communicatively linked to the network 830 (whether illustrated or not), or a combination of the computer 802 and another component. Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807, two or more Memories 807 or similar or differing types can be used according to particular needs, desires, or particular implementations of the computer 802 and the described functionality. While memory 807 is illustrated as an integral component of the computer 802, in alternative implementations, memory 807 can be external to the computer 802.

The application 808 is an algorithmic software engine providing functionality according to particular needs, desires, or particular implementations of the computer 802, particularly with respect to functionality described in the present disclosure. For example, application 808 can serve as one or more components, modules, or applications. Further, although illustrated as a single application 808, the application 808 can be implemented as multiple applications 808 on the computer 802. In addition, although illustrated as integral to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion or management circuits (including recharging, standby, or another power management functionality). In some implementations, the power supply 814 can include a power plug to allow the computer 802 to be plugged into a wall socket or another power source to, for example, power the computer 802 or recharge a rechargeable battery.

There can be any number of computers 802 associated with, or external to, a computer system containing computer 802, each computer 802 communicating over network 830. Further, the term "client," "user," or other appropriate terminology can be used interchangeably, as appropriate, without departing from the scope of the present disclosure. Moreover, the present disclosure contemplates that many users can use one computer 802, or that one user can use multiple computers 802.

Described implementations of the subject matter can include one or more features, alone or in combination.

For example, in a first implementation, a computer-implemented method, comprising: identifying, by a smart table assistance framework, first table information of a table being presented on a table area of a display device, wherein the first table information comprises a set of table functions offered by the table and a table size, and wherein the table size comprises a table width of the presented table and a first total columns' width of first presented columns presented in the table; determining, by the smart table assistance framework, a first size of a first free space available inside the table based on the table width of the presented table and the first total columns' width of the first presented columns; determining, by the smart table assistance framework, whether smart guidance preconditions have been met based on the set of table functions and the first size; and in response to determining that the smart guidance preconditions have been met, adding a first smart guidance of a set of smart guidances to a first position within the first free space available inside the table.

The foregoing and other described implementations can each, optionally, include one or more of the following features:

A first feature, combinable with any of the following features, further comprising: detecting a first interaction with the table that causes the first total columns' width to change to a second total columns' width, the second total columns' width different than the first total columns' width; determining a second size of a second free space available inside the table based on the table width of the presented table and the second total columns' width; determining whether the smart guidance preconditions have been met based on the set of table functions and the second size; and in response to determining that the smart guidance preconditions have been met, adding a second smart guidance of the set of smart guidances to a second position within the second free space available inside the table.

A second feature, combinable with any of the previous or following features, wherein determining that the smart guidance preconditions have been met further comprises: determining that the first size is greater than or equal to a minimum smart guidance space threshold; and determining that the set of table functions comprise at least one of adding a column, removing a column, sorting columns, filtering columns, grouping content of columns, or resizing columns.

A third feature, combinable with any of the previous or following features, wherein the first position of the first smart guidance within the first free space available inside the table and a first smart guidance size of the first smart guidance is based on the first size.

A fourth feature, combinable with any of the previous or following features, wherein a smart guidance comprises at least one or more of an illustration, a title, a description, an icon button corresponding to an action, a carousel having paging buttons, a paging indicator, or an animation.

A fifth feature, combinable with any of the previous or following features, further comprising, prior to adding the first smart guidance of the set of smart guidances to the first position within the first free space available inside the table: selecting the first smart guidance from the set of smart guidances, wherein each smart guidance of the set of smart guidances corresponds to a respective table function of the set of table functions offered by the table, and wherein selecting the first smart guidance from the set of smart guidances is based on at least one of a user selection of one of the set of table functions offered by the table or an automatic selection, by the smart table assistance framework, of one of the set of table functions offered by the table and a table type of the presented table.

A sixth feature, combinable with any of the previous or following features, wherein a table type of the presented table comprises a responsive table, an analytical table, a tree table, or a grid table.

In a second implementation, a computer-implemented system, comprising: one or more computers; and one or more computer memory devices interoperably coupled with the one or more processors and having tangible, non-transitory, machine-readable media storing one or more instructions that, when executed by the one or more computers, perform one or more operations comprising: identifying, by a smart table assistance framework, first table information of a table being presented on a table area of a display device, wherein the first table information comprises a set of table functions offered by the table and a table size, and wherein the table size comprises a table width of the presented table and a first total columns' width of first presented columns presented in the table; determining, by the smart table assistance framework, a first size of a first free space available inside the table based on the table width of the presented table and the first total columns' width of the first presented columns; determining, by the smart table assistance framework, whether smart guidance preconditions have been met based on the set of table functions and the first size; and in response to determining that the smart guidance preconditions have been met, adding a first smart guidance of a set of smart guidances to a first position within the first free space available inside the table.

The foregoing and other described implementations can each, optionally, include one or more of the following features:

A first feature, combinable with any of the following features, further comprising: detecting a first interaction with the table that causes the first total columns' width to change to a second total columns' width, the second total columns' width different than the first total columns' width; determining a second size of a second free space available inside the table based on the table width of the presented table and the second total columns' width; determining whether the smart guidance preconditions have been met based on the set of table functions and the second size; and in response to determining that the smart guidance preconditions have been met, adding a second smart guidance of the set of smart guidances to a second position within the second free space available inside the table.

A second feature, combinable with any of the previous or following features, wherein determining that the smart guidance preconditions have been met further comprises: determining that the first size is greater than or equal to a minimum smart guidance space threshold; and determining that the set of table functions comprise at least one of adding a column, removing a column, sorting columns, filtering columns, grouping content of columns, or resizing columns.

A third feature, combinable with any of the previous or following features, wherein the first position of the first smart guidance within the first free space available inside the table and a first smart guidance size of the first smart guidance is based on the first size.

A fourth feature, combinable with any of the previous or following features, wherein a smart guidance comprises at least one or more of an illustration, a title, a description, an icon button corresponding to an action, a carousel having paging buttons, a paging indicator, or an animation.

A fifth feature, combinable with any of the previous or following features, further comprising, prior to adding the first smart guidance of the set of smart guidances to the first position within the first free space available inside the table: selecting the first smart guidance from the set of smart guidances, wherein each smart guidance of the set of smart guidances corresponds to a respective table function of the set of table functions offered by the table, and wherein selecting the first smart guidance from the set of smart guidances is based on at least one of a user selection of one of the set of table functions offered by the table or an automatic selection, by the smart table assistance framework, of one of the set of table functions offered by the table and a table type of the presented table.

A sixth feature, combinable with any of the previous or following features, wherein a table type of the presented table comprises a responsive table, an analytical table, a tree table, or a grid table.

In a third implementation, a non-transitory, computer-readable medium storing one or more instructions executable by a computer system to perform operations comprising: identifying, by a smart table assistance framework, first table information of a table being presented on a table area of a display device, wherein the first table information comprises a set of table functions offered by the table and a table size, and wherein the table size comprises a table width of the presented table and a first total columns' width of first presented columns presented in the table; determining, by the smart table assistance framework, a first size of a first free space available inside the table based on the table width of the presented table and the first total columns' width of the first presented columns; determining, by the smart table assistance framework, whether smart guidance preconditions have been met based on the set of table functions and the first size; and in response to determining that the smart guidance preconditions have been met, adding a first smart guidance of a set of smart guidances to a first position within the first free space available inside the table.

The foregoing and other described implementations can each, optionally, include one or more of the following features:

A first feature, combinable with any of the following features, further comprising: detecting a first interaction with the table that causes the first total columns' width to change to a second total columns' width, the second total columns' width different than the first total columns' width; determining a second size of a second free space available inside the table based on the table width of the presented table and the second total columns' width; determining whether the smart guidance preconditions have been met based on the set of table functions and the second size; and in response to determining that the smart guidance preconditions have been met, adding a second smart guidance of the set of smart guidances to a second position within the second free space available inside the table.

A second feature, combinable with any of the previous or following features, wherein determining that the smart guidance preconditions have been met further comprises: determining that the first size is greater than or equal to a minimum smart guidance space threshold; and determining that the set of table functions comprise at least one of adding a column, removing a column, sorting columns, filtering columns, grouping content of columns, or resizing columns.

A third feature, combinable with any of the previous or following features, wherein the first position of the first smart guidance within the first free space available inside the table and a first smart guidance size of the first smart guidance is based on the first size.

A fourth feature, combinable with any of the previous or following features, wherein a smart guidance comprises at least one or more of an illustration, a title, a description, an icon button corresponding to an action, a carousel having paging buttons, a paging indicator, or an animation.

A fifth feature, combinable with any of the previous or following features, further comprising, prior to adding the first smart guidance of the set of smart guidances to the first position within the first free space available inside the table: selecting the first smart guidance from the set of smart guidances, wherein each smart guidance of the set of smart guidances corresponds to a respective table function of the set of table functions offered by the table, and wherein selecting the first smart guidance from the set of smart guidances is based on at least one of a user selection of one of the set of table functions offered by the table or an automatic selection, by the smart table assistance framework, of one of the set of table functions offered by the table and a table type of the presented table.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   identifying, by a smart table assistance framework, first table information of a table being presented on a table area of a display device, wherein the first table information comprises a set of table functions offered by the table and a table size, and wherein the table size comprises a table width of the presented table and a first total columns' width of first presented columns presented in the table;
   determining, by the smart table assistance framework, a first size of a first free space available inside the table based on the table width of the presented table and the first total columns' width of the first presented columns;
   determining, by the smart table assistance framework, whether smart guidance preconditions have been met based on the set of table functions and the first size; and in response to determining that the smart guidance preconditions have been met, adding a first smart guidance of a set of smart guidances to a first position within the first free space available inside the table.

2. The computer-implemented method of claim 1, further comprising:
  detecting a first interaction with the table that causes the first total columns' width to change to a second total columns' width, the second total columns' width different than the first total columns' width;
  determining a second size of a second free space available inside the table based on the table width of the presented table and the second total columns' width;
  determining whether the smart guidance preconditions have been met based on the set of table functions and the second size; and
  in response to determining that the smart guidance preconditions have been met, adding a second smart guidance of the set of smart guidances to a second position within the second free space available inside the table.

3. The computer-implemented method of claim 1, wherein determining that the smart guidance preconditions have been met further comprises:
  determining that the first size is greater than or equal to a minimum smart guidance space threshold; and
  determining that the set of table functions comprise at least one of adding a column, removing a column, sorting columns, filtering columns, grouping content of columns, or resizing columns.

4. The computer-implemented method of claim 1, wherein the first position of the first smart guidance within the first free space available inside the table and a first smart guidance size of the first smart guidance is based on the first size.

5. The computer-implemented method of claim 1, wherein a smart guidance comprises at least one or more of an illustration, a title, a description, an icon button corresponding to an action, a carousel having paging buttons, a paging indicator, or an animation.

6. The computer-implemented method of claim 1, further comprising, prior to adding the first smart guidance of the set of smart guidances to the first position within the first free space available inside the table:
  selecting the first smart guidance from the set of smart guidances, wherein each smart guidance of the set of smart guidances corresponds to a respective table function of the set of table functions offered by the table, and wherein selecting the first smart guidance from the set of smart guidances is based on at least one of a user selection of one of the set of table functions offered by the table or an automatic selection, by the smart table assistance framework, of one of the set of table functions offered by the table and a table type of the presented table.

7. The computer-implemented method of claim 1, wherein a table type of the presented table comprises a responsive table, an analytical table, a tree table, or a grid table.

8. A computer-implemented system, comprising:
  one or more computers; and
  one or more computer memory devices interoperably coupled with the one or more processors and having tangible, non-transitory, machine-readable media storing one or more instructions that, when executed by the one or more computers, perform one or more operations comprising:
    identifying, by a smart table assistance framework, first table information of a table being presented on a table area of a display device, wherein the first table information comprises a set of table functions offered by the table and a table size, and wherein the table size comprises a table width of the presented table and a first total columns' width of first presented columns presented in the table;
    determining, by the smart table assistance framework, a first size of a first free space available inside the table based on the table width of the presented table and the first total columns' width of the first presented columns;
    determining, by the smart table assistance framework, whether smart guidance preconditions have been met based on the set of table functions and the first size; and
    in response to determining that the smart guidance preconditions have been met, adding a first smart guidance of a set of smart guidances to a first position within the first free space available inside the table.

9. The computer-implemented system of claim 8, further comprising:
  detecting a first interaction with the table that causes the first total columns' width to change to a second total columns' width, the second total columns' width different than the first total columns' width;
  determining a second size of a second free space available inside the table based on the table width of the presented table and the second total columns' width;
  determining whether the smart guidance preconditions have been met based on the set of table functions and the second size; and
  in response to determining that the smart guidance preconditions have been met, adding a second smart guidance of the set of smart guidances to a second position within the second free space available inside the table.

10. The computer-implemented system of claim 8, wherein determining that the smart guidance preconditions have been met further comprises:
  determining that the first size is greater than or equal to a minimum smart guidance space threshold; and
  determining that the set of table functions comprise at least one of adding a column, removing a column, sorting columns, filtering columns, grouping content of columns, or resizing columns.

11. The computer-implemented system of claim 8, wherein the first position of the first smart guidance within the first free space available inside the table and a first smart guidance size of the first smart guidance is based on the first size.

12. The computer-implemented system of claim 8, wherein a smart guidance comprises at least one or more of an illustration, a title, a description, an icon button corresponding to an action, a carousel having paging buttons, a paging indicator, or an animation.

13. The computer-implemented system of claim 8, further comprising, prior to adding the first smart guidance of the set of smart guidances to the first position within the first free space available inside the table:
  selecting the first smart guidance from the set of smart guidances, wherein each smart guidance of the set of smart guidances corresponds to a respective table function of the set of table functions offered by the table, and wherein selecting the first smart guidance from the set of smart guidances is based on at least one of a user selection of one of the set of table functions offered by the table or an automatic selection, by the smart table assistance framework, of one of the set of table functions offered by the table and a table type of the presented table.

14. The computer-implemented system of claim 8, wherein a table type of the presented table comprises a responsive table, an analytical table, a tree table, or a grid table.

15. A non-transitory, computer-readable medium storing one or more instructions executable by a computer system to perform operations comprising:
- identifying, by a smart table assistance framework, first table information of a table being presented on a table area of a display device, wherein the first table information comprises a set of table functions offered by the table and a table size, and wherein the table size comprises a table width of the presented table and a first total columns' width of first presented columns presented in the table;
- determining, by the smart table assistance framework, a first size of a first free space available inside the table based on the table width of the presented table and the first total columns' width of the first presented columns;
- determining, by the smart table assistance framework, whether smart guidance preconditions have been met based on the set of table functions and the first size; and
- in response to determining that the smart guidance preconditions have been met, adding a first smart guidance of a set of smart guidances to a first position within the first free space available inside the table.

16. The non-transitory, computer-readable medium of claim 15, further comprising:
- detecting a first interaction with the table that causes the first total columns' width to change to a second total columns' width, the second total columns' width different than the first total columns' width;
- determining a second size of a second free space available inside the table based on the table width of the presented table and the second total columns' width;
- determining whether the smart guidance preconditions have been met based on the set of table functions and the second size; and
- in response to determining that the smart guidance preconditions have been met, adding a second smart guidance of the set of smart guidances to a second position within the second free space available inside the table.

17. The non-transitory, computer-readable medium of claim 15, wherein determining that the smart guidance preconditions have been met further comprises:
- determining that the first size is greater than or equal to a minimum smart guidance space threshold; and
- determining that the set of table functions comprise at least one of adding a column, removing a column, sorting columns, filtering columns, grouping content of columns, or resizing columns.

18. The non-transitory, computer-readable medium of claim 15, wherein the first position of the first smart guidance within the first free space available inside the table and a first smart guidance size of the first smart guidance is based on the first size.

19. The non-transitory, computer-readable medium of claim 15, wherein a smart guidance comprises at least one or more of an illustration, a title, a description, an icon button corresponding to an action, a carousel having paging buttons, a paging indicator, or an animation.

20. The non-transitory, computer-readable medium of claim 15, further comprising, prior to adding the first smart guidance of the set of smart guidances to the first position within the first free space available inside the table:
- selecting the first smart guidance from the set of smart guidances, wherein each smart guidance of the set of smart guidances corresponds to a respective table function of the set of table functions offered by the table, and wherein selecting the first smart guidance from the set of smart guidances is based on at least one of a user selection of one of the set of table functions offered by the table or an automatic selection, by the smart table assistance framework, of one of the set of table functions offered by the table and a table type of the presented table.

* * * * *